Sept. 22, 1936.  B. M. SHORT  2,054,838
BEAD CONSTRUCTION FOR BUMPERS
Filed June 23, 1934
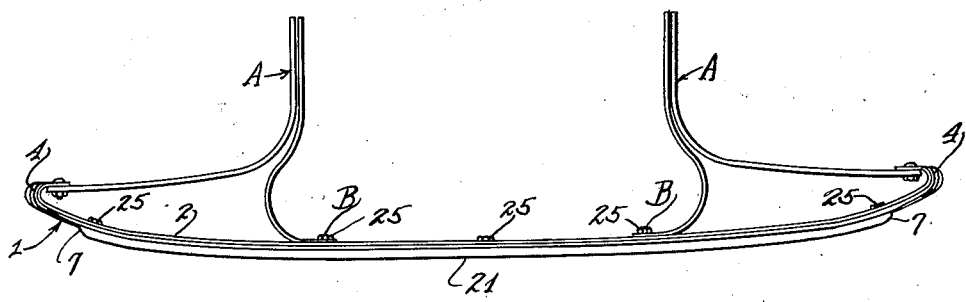
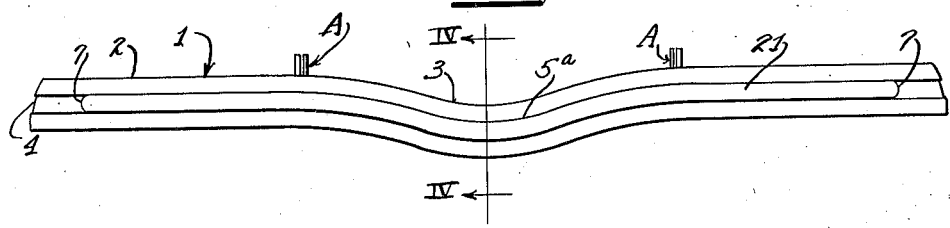
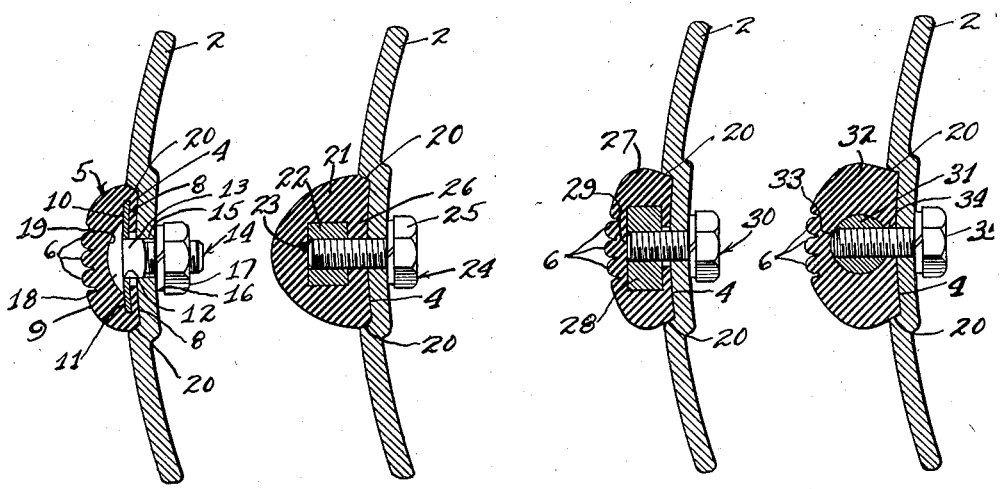
Inventor
Bladen M. Short.

Patented Sept. 22, 1936

2,054,838

UNITED STATES PATENT OFFICE 2,054,838

BEAD CONSTRUCTION FOR BUMPERS

Bladen M. Short, Detroit, Mich., assignor to General Spring Bumper Corporation, Detroit, Mich., a corporation of Michigan Application June 23, 1934, Serial No. 732,027

4 Claims. (Cl. 293—55)

This invention has to do with beading for bumpers and the like and concerns more particularly a cushion bead of live rubber or the like provided with means for securely holding the same in proper relation to the bumper or the like.

It is an object of the invention to provide an improved cushion bead construction for protecting and, at the same time, ornamenting the impact face of a bumper bar.

It is another object of the invention to provide a cushion bead construction having elastic properties and associated with means whereby the same may be caused to follow a non-rectilinear path along a bumper bar which may be of similar contour.

A further object of the invention resides in the provision of an ornamental and cushioning bead with means whereby the same may be secured to an impact bar and yet be entirely concealed from the front.

A further object of the invention involves the provision of a preferably metallic strip or core and a cushion strip formed to be assembled in embracing relation to the core, so that the cushion bead will follow the contour of the core.

Another object of the invention resides in a cushion bead structure formed to be secured in wedging relation to the bar upon which the same is mounted.

In accordance with the general features of the invention, an impact bar is provided with a preferably longitudinal groove in its impact face, and this groove may have a non-rectilinear shape longitudinally and such groove may be parallel with one or both edges of the bar. A strip of metal of the same form as the groove and preferably substantially coextensive with the groove is provided. A strip of live rubber or other suitable cushion material and having the shape of a C in cross-section, with its groove substantially the same width as the strip, is worked onto the metal strip so as to embrace the marginal portions thereof tightly, and thereby follow the contour of the metal strip. Prior to the working on of the strip, bolts are fitted in the metal strip so that the heads of the same are foremost, and the rubber strip is recessed to fit over the heads when the rubber is assembled with the metal strip.

The width of the rubber is such that when the bolts extending through the bar are tightened, a wedging engagement is provided with the edges of the groove in the bumper bar.

The rubber strip may be suitably ornamented as by providing elongated ridges therein, or the same may be bullet-nosed in cross-section for stream lining purposes.

In accordance with another form of the invention, the rubber may be molded over and about the core, the latter being provided with threaded openings for the reception of attaching bolts. If desired, instead of providing bolts whose heads fit between the metal and rubber strips, as above described, the metal strip over which the rubber is to be worked may be provided with spaced threaded openings for the reception of attaching bolts.

The structure embodying the invention is extremely neat, involves few parts which are readily assembled, and provides a means which renders the rubber readily capable of following any desired contour, notwithstanding its elastic properties, and to serve as a means for protecting the adjacent exposed impact surface of the impact bar, and also serves as an effective ornamenting means for the bar.

Other important objects and advantages of the invention will appear as the description proceeds.

This invention (in preferred forms) is illustrated in the drawing and hereinafter more fully described.

Figure 1 is a plan view of a bumper structure embodying the invention.

Figure 2 is a front elevation of the structure shown in Figure 1.

Figures 3, 4, 5 and 6 are enlarged sectional views of different forms of the invention, appearing substantially identically in Figures 1 and 2 and taken substantially in the plane designated by the line IV—IV in Figure 2.

Figure 7 is a rear fragmentary elevational view, partly broken away, showing details of the bead construction appearing in Figure 3.

Referring now more particularly to the drawing, the bumper 1 has been chosen for illustrative purposes as provided with an impact bar 2 which is formed with a center dip 3 and with a groove 4 substantially co-extensive therewith and having also a central dip at 5a so as to be substantially parallel with the bumper bar 2.

In accordance with the form of bead structure shown in Figure 3, there is provided a strip 5 of rubber or other suitable cushioning material having elastic properties and ornamented on its front face as by ribs 6. The strip 5 preferably is supplied from a reel or the like and cut therefrom to size, and while the same may be of any desired length relative to the impact bar 1, the strip is preferably substantially coextensive with the bar as shown in Figures 1 and 2.

If desired, however, the strip 5 may be molded so that its ends are closed or otherwise suitably finished as at 7 in Figures 1 and 2.

The strip 5 is of C shape in cross-section, with its lips 8 preferably of substantially less thickness than the impact receiving body 9 thereof.

The elasticity of the material of which the strip 5 is made prevents the strip from being properly positioned in the groove 4 so as to fit in the dip 5a therein, due to the tendency of the strip to assume its normal condition of extending in a substantially straight line. This difficulty is overcome by the provision of a relatively rigid but properly shaped core of metal or other suitable material.

In the form of the invention shown in Figure 3, the core comprises a strip 10 of sheet metal of a width substantially equal to the width of the groove 11 in the cushion strip 5 so as to fit snugly therein, and of such width as to be embraced snugly by the cushion strip 5 on both sides and the longitudinal edges of the core strip 10. The strip 10 is provided at suitable intervals lengthwise thereof, preferably including its dip, with bolt holes 12 which are preferably square to accommodate the square shoulders 13 of the bolts 14, the impact bar 2 being provided with correspondingly located openings 15 through which the shanks of the bolts extend, for the reception of the lock washer 16 and nut 17 at the rear of the impact bar.

The bolts 14 are provided with suitably shaped heads, those illustrated being round as shown at 18. To accommodate the heads 18, the cushion strip 5 is formed with a depression 19 which is substantially coextensive with the strip 5 and is arranged in the rear side of the body 9 and is curved transversely to engage the curved surface of the head 18. By virtue of this recess, the core strip 10 and associated bolts 14 may be readily assembled with the cushion strip 5. The parts may be worked together telescopically by inserting one end of the core strip 10 in the groove 11 by forcing the lips 8 near the corresponding end of the strip 5 apart, and thereafter shoving the core strip 10 longitudinally along the groove 11 against the friction exerted by the portions of the rubber or the like lining said groove, until the entire core strip 10 is disposed as shown in Figure 3. This method involves initially placing the strips in substantially end to end relation. If desired, however, the strips may be placed one back of the other, with the core strip at the rear, and one end of the strip fitted into the groove in the cushion strip by first spreading apart the lips 8 to enable the groove to accommodate one end of the core strip.

Thereafter, while the end lip portions are held in embracing relation to the end of the core strip, a tool having portions engageable between the rear face of the core strip 10 and the inner portions of the lips 8 is forced along the said rear surface of the core strip 10, thereby spreading the lips 8 apart progressively along the core strip and forcing said lips to slip over the rear margins of the core strip 10, until the entire core strip is disposed within the cushion strip.

The strips may also be assembled by placing the strip 10 with its associated bolts 14 so that one of the margins of the strip 10 is fitted in the strip 5 as shown in Figure 3, and the other margin of the core strip 10 is projected between the lips 8 and extends outside of the other lip. Thereupon, a tool is used substantially as a crow bar, engaging the free edge of the strip 10 and within the corresponding lip 8, and operated so as to force the lip out and about the said free margin of the strip 10. Thereafter, while the lip portions engaging the rear of the strip 10 are held thereagainst, a tool is inserted between the remainder of the free lip and the corresponding margin of the strip 10, and said portion of the lip is worked rearwardly over the said margin until the strips throughout their entire lengths are assembled as shown in Figure 3.

Of course, other ways may be found to conveniently assemble the parts.

After they are assembled, the strips 5 and 10 and the bolts 14 constitute a unit. This unit is of the same shape as the groove 4 by virtue of the strip 10 having been given that shape, so that the unit is readily placed in the groove 4, the shanks of the bolts 14 positioned in the impact bar openings 15, after which the washer and nut elements are applied. The washers are preferably of the spring type, and the yieldable lips 8 afford a further cushion between the strip 10 and nut. The lips 8 also afford a cushion for the strip 10 and serve to prevent rattling between the various parts. The width of the cushion strip 5 is preferably slightly greater than the width of the groove 4, and the upper and lower edges 20 of the groove are preferably diverging so as to form wedge surfaces which, when the nut 17 is tightened, have a snug and firm wedging engagement with the corresponding longitudinal edges of the strip 5.

The core strip 10 and lips 8 are of substantial width so as to preclude the lips 8 from working out due to impacts upon the cushion strip 5.

The ends of the core strip 10 are preferably rounded at the edges thereof in a manner similar to that shown at 7 for the cushion strip, for the purpose of enabling the core strip ends thus rounded or reduced in size to be more readily forced longitudinally into the cushion strip 5 in the event it is desired to use that manner of assembling the strips.

Figure 4 shows a modified form of bead structure and securing means. In this form of the invention, in order that the bead may harmonize with the stream lining which is found in current automobile construction, the cushion bead 21 is formed in cross-section to simulate the nose of a bullet, and is of such width as to have a wedging engagement with the longitudinal edges 20 of the groove 4 substantially as described above in connection with the form appearing in Figure 3. In the construction of Figure 4, moreover, while the bead 21 may be substantially C-shaped, it is preferably molded completely about the metallic or other relatively rigid core 22, the latter being provided at predetermined intervals therealong with threaded openings 23 for the reception of the threaded shanks of the bolts 24, the latter having their heads 25 arranged at the rear of the impact bar 2. Of course, the rear portion 26 of the strip 21 is formed with openings registering with the openings 23 in order that the bolts may be applied to the core strip 22. The latter is of course pre-formed to the shape of the groove 4 and the cushion strip 21 molded directly thereabout and vulcanized.

In the form of the invention appearing in Figure 5, the cushion strip 27 may be provided with the design at 6 similar to that on the strip 5 of Figure 3, and may be substantially C-shaped to be assembled with the core strip or rod 27 in any suitable manner as described above in connection with Figure 3, or the strip 27 may be molded about the core 28. In any event, the core 28 is provided with suitably spaced openings 29 to receive the threaded shanks of the bolts at 30. The cushion strip 27 is formed to cooperate in having a wedging engagement with the longitudinal edges 20 of the impact bar 2 as described above in connection with other forms of the invention.

Figure 6 shows a modification of Figure 5, in that a cylindrical rod 31 provides the core for the cushion strip 32, the latter cooperating to have a wedge engagement with the edges 20 of the groove 4 in substantially the same way as described above in connection with other forms of the invention. The cushion strip 32 may be provided with any suitable ornamentation such as the ribs 6. The cushion strip 32 is preferably molded about the core rod 31, the latter and the strip 32 being provided with openings 33 and 34, respectively, at suitable intervals as above described to accommodate the attaching bolts 35. The rod 31 is of course formed to simulate the groove 4 in shape, and when the rubber or like cushioning material 32 is assembled with the rod, the unit has the same general shape and may be readily applied to the groove and fastened in place.

It will be observed that notwithstanding the mounting of the cushion unit upon the impact bar, a substantial area of the impact surface of the bumper bar is exposed and the cushion means may be provided in black or other color while the impact surface is chrome plated or similarly surfaced to provide an ornamental contrast in colors. The cushion unit may extend entirely throughout the length of the impact bar or it may extend throughout any part thereof.

In Figures 1 and 2, the impact bar is shown secured to a back bar structure A at each side for cushioning the impact bar from the rear and also attaching the same to the frame or other part of the vehicle. It is to be appreciated, however, that coil springs or any other desired form of cushion construction may be provided without departing from the principles of the invention.

Accordingly, while the cushion strip unit securing means B are shown as passing through an element of the back bar structure, yet in the event of employment of other mounting bar constructions, said securing means would not necessarily pass through the mounting bar construction.

It is to be understood that while Figures 1 and 2 appear to illustrate more particularly the construction shown in detail in cross-section in Figure 4, like views of the forms appearing in the remaining figures would appear substantially identical, and for practical purposes it may be stated that Figures 1 and 2 are respectively plan and elevation views of each of the forms of the invention.

The core, as will be seen from the foregoing, may be of any desired cross-section, and the rubber may be formed independently of the core and thereafter assembled therewith, or may be vulcanized to or molded about the core, the latter being of relatively stiff material such as metal. The core is preferably capable of being bent to desired shapes such as the dip shown in Figure 2, and may be made of aluminum, steel or other metal. The core is also of such a character as to be readily bent in any plane, and it will be observed from Figures 1 and 2 that the cushion strip unit has its end portions extending slightly rearwardly to correspond with the shape of the impact bar, as well as having its intermediate portion bent downwardly to correspond with the shape of the central part of the impact bar.

The number of attaching instrumentalities may, of course, be varied, five having been found suitable as shown.

While rubber has been mentioned as a suitable material for the cushion strip, other suitable materials may be used.

It is to be understood that in the event a plurality of grooves are formed in the impact bar, a commensurate number of cushion units may be applied thereto. It is also to be undertood that cushion units may be provided in various shapes and if desired, in the event an impact bar is provided with grooves or other formations of different shapes, the cushion devices may be correspondingly formed to cooperate therewith.

If desired, the impact part of the cushion unit may be of fibre or plastic floor composition or the like.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Bumper construction comprising a horizontally extending impact bar having an edge-bent intermediate vertically offset portion to increase the vertical impact range of the bar and having a longitudinal groove in its impact face and substantially parallel to the bar, leaving upstanding impact areas extending substantially above and below said groove, an elongated cushion device in the groove, and means associated with said device and bar for holding the device to the longitudinal shape of the groove.

2. Bumper construction comprising a resilient impact bar formed to flex upon impact and having an intermediate vertically offset portion to increase the effective impact height of the bar, and having an elongated vertically offset formation substantially parallel to and remote from one edge of the bar, said bar having a generally vertically extended impact receiving area between said formation and said edge, and a protective device shaped like and secured to said formation in a position clear of and projecting in advance of said area to protect the same from marring by a colliding object such as another bumper along the bar, said device comprising a relatively soft resilient cushioning strip embracing a relatively stiff reinforcing strip of sufficient flexibility to follow the flexure of said bar.

3. In a bumper, a longitudinal bar, a protective beading strip comprising a casing of elastic cushioning material, and a reinforcing rod or strip of relatively stiff, inelastic pliable material embraced by said casing so as to constitute a unit therewith, said rod or strip being capable of being bent into and retaining itself in a variety of shapes while embraced by said casing so as to be adaptable to the longitudinal shape of a portion of the bar, said rod or strip having means for attaching the unit in the desired shape to said bar, said bar having a groove of an irregular longitudinal shape with said beading strip deflected and bent to conform to said groove and being secured therein by said means.

4. Bumper construction comprising an impact bar having a longitudinally extending recess in its impact face with a substantial impact area extending generally vertically adjacent said recess, and a protective device for said area and comprising relatively fixed exterior cushioning and interior reinforcing parts forming a unit which is deflectable so as to be fitted in and to correspond to the longitudinal shape of the recess and said unit being provided with means for retaining it in said recess, said recess being so shaped that said unit may be readily fitted into and removed from said recess without necessitating substantial relative adjustment of said parts.

BLADEN M. SHORT.